United States Patent [19]
Golla et al.

[11] Patent Number: 5,400,272
[45] Date of Patent: Mar. 21, 1995

[54] DIAGONAL PROPAGATION DIGITAL MULTIPLIER

[75] Inventors: Carla Golla, Sesto; Sali M. Luigi, St. Angelo Lodigiano, both of Italy

[73] Assignee: SGS-Thomson Microelectronics S.r.l., Agrate Brianza, Italy

[21] Appl. No.: 45,627

[22] Filed: Apr. 9, 1993

[30] Foreign Application Priority Data

Apr. 10, 1992 [EP] European Pat. Off. ............ 92830178

[51] Int. Cl.[6] .................................................. G06F 7/52
[52] U.S. Cl. .................................... 364/757; 364/724.16
[58] Field of Search ............... 364/754, 757, 758, 759, 364/724.16

[56] References Cited

U.S. PATENT DOCUMENTS

| | | | |
|---|---|---|---|
| 4,189,767 | 2/1980 | Ahuja | 364/200 |
| 4,910,700 | 3/1990 | Hartley et al. | 364/754 |
| 4,982,355 | 1/1991 | Nishimura et al. | 364/758 |
| 5,255,216 | 10/1993 | Blanz et al. | 364/757 |

OTHER PUBLICATIONS

IEEE Journal of Solid-State Circuits, vol. 18, No. 3, Jun. 1983, New York, US pp. 280-285, P. Draheim "Digital Signal Processing for Video Applications".

*Primary Examiner*—David H. Malzahn
*Attorney, Agent, or Firm*—Wolf, Greenfield & Sacks

[57] ABSTRACT

A diagonal propagation, digital multiplier of a kind adapted to multiply a first factor by a second factor, with the factors each being expressed as a binary number including a non-volatile memory having a plurality of cells each with one digit of a factor stored therein, a plurality of computation blocks cascade connected together, each block being also connected to a corresponding cell in the memory, computation stage in each of the blocks for performing a binary sum of the first factor plus one digit of the second factor, and memory elements in each of the blocks for storing therein the result of the calculation and making it available as a pseudo-carryover to the next block.

15 Claims, 4 Drawing Sheets

DIAGONAL PROPAGATION DIGITAL MULTIPLIER

BACKGROUND OF THE INVENTION

1. Field of the Invention

This invention relates to a diagonal propagation, digital multiplier of a type intended for multiplying a first factor (x(n)) by a second factor (M), with either factor being expressed by a binary number.

The field of application of the invention is related, in particular but not solely, to digital FIR (Finite Impulse Response) filters and reference will be made, throughout this description, to that field of application for convenience of illustration.

2. Discussion of the Related Art

As is known, digital filters are devices designed to convert a sampled signal x(n) being input thereto into another sampled signal y(n) having predetermined frequency response characteristics. A sampled signal is, of course, a digital signal encoded as a binary number of N digits or bits on which the filter accuracy or resolution is dependent.

The prior art teaches filters in integrated circuit form that comprise digital multipliers and adders arranged so as to produce, for each input, an output y(n) given by the sum of the present and past input samples each multiplied by a respective coefficient d(i), to be obtained from the filter pulse response.

For example, a typical filter of conventional construction uses a chain of N-1 adders, each provided with first and second inputs, and an output. The output of each one adder is connected to the first input of the next, through a delay block (T), and the second input of each adder is connected to the output of a corresponding digital multiplier (X). The various coefficients d(i) of response to the filter pulse are associated directly with the multipliers (X).

According to the prior art, the multipliers have been embodied by circuit structures which are quite complex and slow during processing.

Structures of that kind are described, for instance, in Joseph Cavanagh, "Digital Computer Arithmetics", McGraw-Hill, pages 137-235.

The slow speed of prior art multipliers imposes a serious limitation on the implementation of fast digital filters; in fact, the most widely used commercial designs can only perform satisfactorily when operated at a low frequency.

Another limitation of current designs results from the extreme difficulty of implementing so-called adaptive filters, i.e. filters for which the value of one of the multiplicative factors, such as that of the filter coefficients d(i), for example, can be readily changed.

SUMMARY OF THE INVENTION

The underlying technical problem addressed by this invention is to provide a digital multiplier that has structural and functional features enabling it to operate at a faster rate, and making digital filters of the adaptive type feasible, to thereby overcome the limitations of prior embodiments. The solutive idea on which the invention stands is that of first storing one of the multiplicative factors, and then performing the multiplication on binary numbers using the properties of pseudo-carryover and pseudo-sum to make the value of one of the multiplicative factors readily modifiable and to minimize the computing time for the multiplication.

The invention includes a diagonal propagation digital multiplier for multiplying a first factor by a second factor wherein at least one of the first and second factors is expressed as a binary number. The digital multiplier includes a memory having a plurality of cells each with one digit of one of the first and second factors stored therein, a plurality of computation blocks being cascade connected to one another and also each computation block being coupled to a respective corresponding cell in the memories, computation means in each of the computation blocks for computing a binary sum of the first factor and at least one digit of the second factor, and a plurality of memory elements in each of the computation blocks for storing the binary sum and making the binary sum available as a pseudo-carryover to another computation block in the plurality of computation blocks. The memory may be a non-volatile, programmable memory.

The features and advantages of a digital multiplier according to the invention will become apparent from the following description of an embodiment thereof, given by way of example and not of limitation with reference to the accompanying drawings.

DETAILED DESCRIPTION

Figure 1:
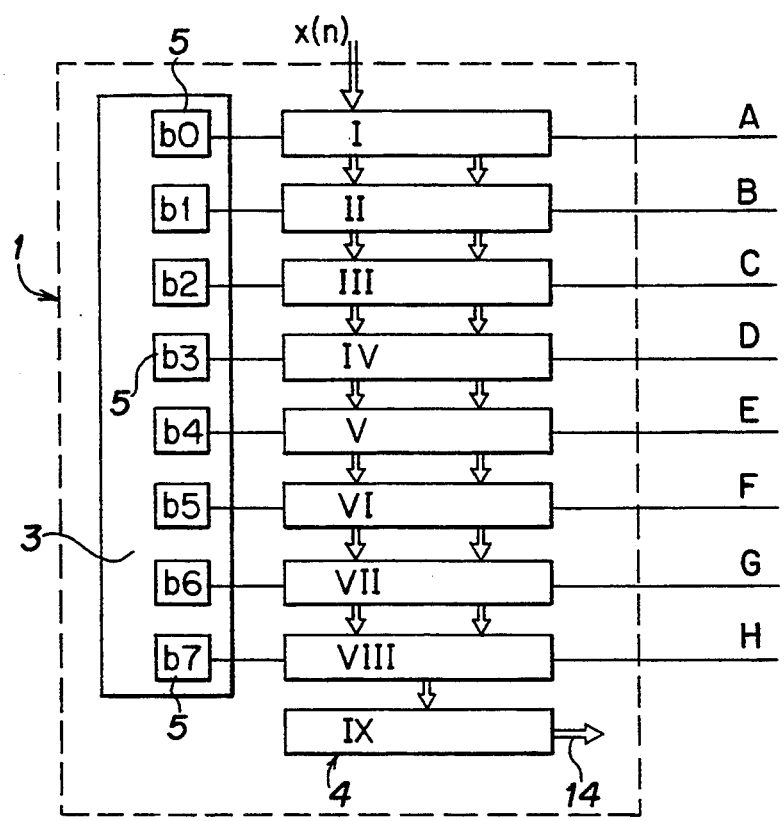
FIG. 1 is a diagrammatic view of a digital multiplier embodying the invention.

With reference to the drawing views, generally and schematically shown at 1 is a digital multiplier embodying this invention.

Figure 2:
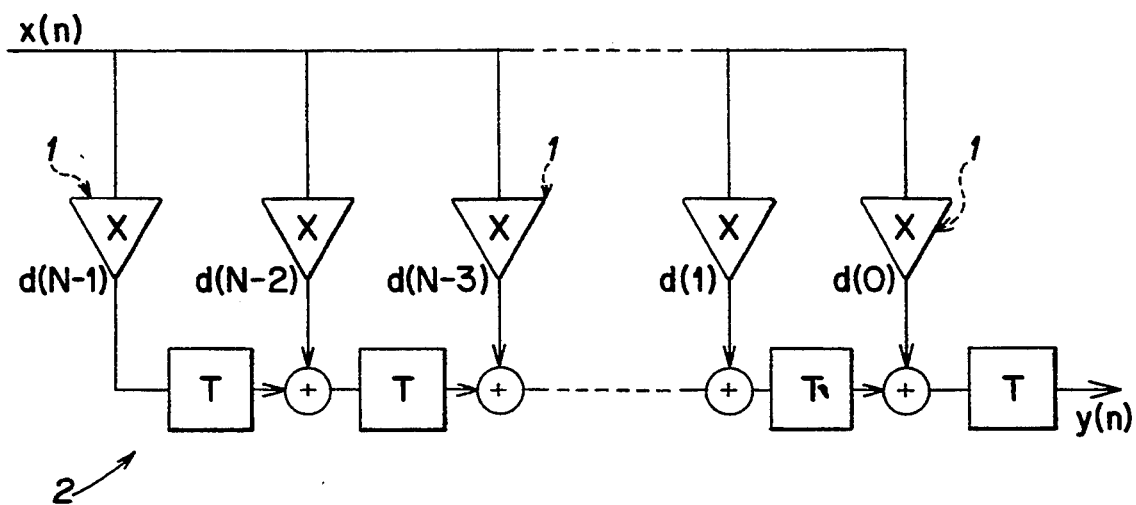
FIG. 2 is a diagrammatic view of a conventional digital filter structure.

The multiplier 1 may be incorporated, for example, into a digital filter 2, shown in FIG. 2, which receives as input a given digital code sampled signal x(n), and outputs another sampled signal y(n) having predetermined frequency response characteristics.

The filter 2 is a so-called linear FIR (Finite Impulse Response) type, i.e. wherein at each n-th discrete time the input x(n) and output y(n) signals are related by the following relation:

$$y(n) = \sum_{i=0}^{N-1} b(i) \times (n - i) \quad (1)$$

from which it is apparent that the output sample y(n) is only dependent on the present and past input samples.

The coefficients d(i) are a finite number N and can be obtained from the response to the filter pulse. Basically, relation (1) shows that an output sequence y(n) can be obtained from an input sequence x(n) by carrying out a series of products and sums between those samples which represent the system response to the impulse and the input samples as suitably delayed.

Accordingly, within the filter 2, each multiplier 1 is arranged to perform multiplication of a first factor, represented by the input signal x(n), by a second factor M, represented by a coefficient d(i).

Advantageously, the multiplier 1 of this invention includes a memory 3 wherein the various digits or bits of a i-th coefficient d(i) are stored.

The memory 3 is a non-volatile type and implemented preferably as a programmable EPROM memory. However, other memory types, e.g. a RAM type, may also be used.

In the exemplary embodiment under consideration, the coefficients are coded with eight bits and accordingly, the memory 3 comprises eight cells 5, each containing one digit or bit of a corresponding coefficient d0 ... d7. As a whole, in the filter 1 there are N memories each having eight bits.

The multiplier 1 further comprises a group of N computation blocks, each having a specific circuit structure to be described. In this case, there are eight blocks, and each block has been denoted by a corresponding Roman numeral I, II, ..., VIII.

The eight cells 5 of memory 3 are arranged correspondingly with the eight blocks I, II, ..., VIII, and each cell 5 is connected to its corresponding block to supply it with the value of the bit corresponding to the coefficient stored therein.

Also provided is a final block, indicated at 4, which is operative to make the result of the product operation available in explicit form on the output.

Each computation block includes computing means for performing a binary arithmetic operation, as well as storage elements for storing the operation result therein.

Figure 3:
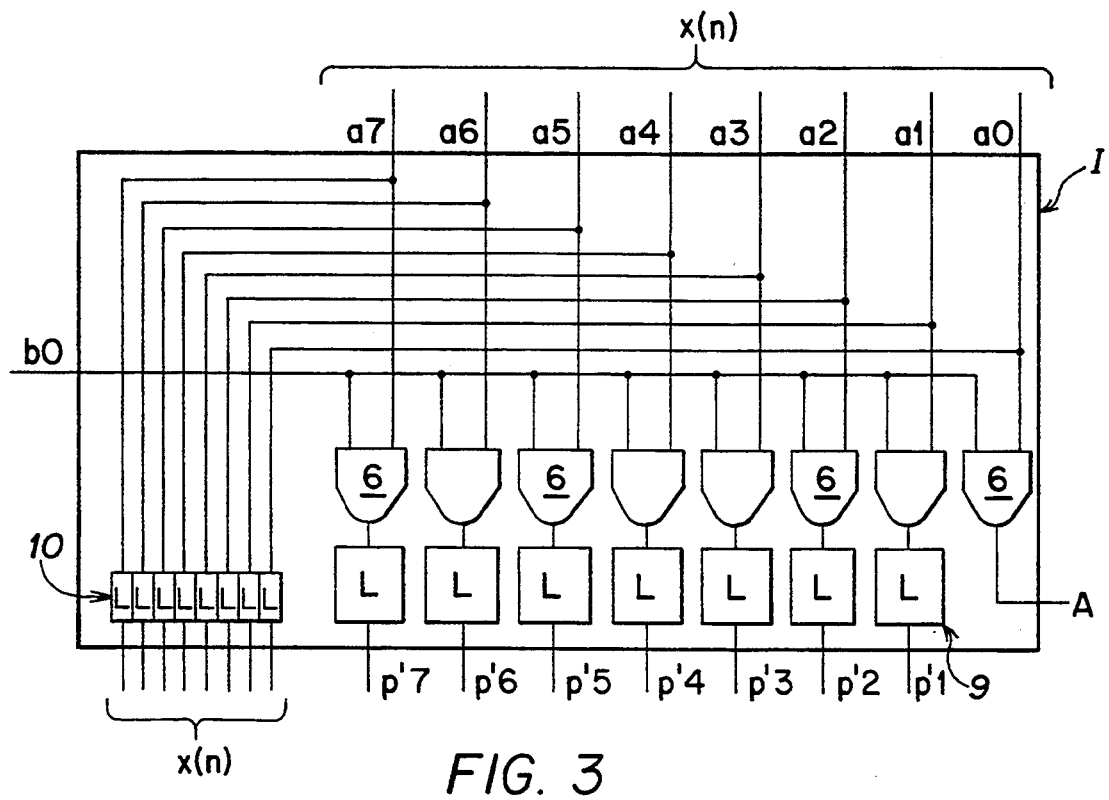
FIG. 3 is a schematic diagram of a computation block used in the digital multiplier of FIG. 1.

FIG. 3 shows in detail the structure of the first computation block I, which comprises a series of inputs a0 ... a7 in parallel arrangement and adapted to receive the input signal x(n). In the example illustrated, the input signal x(n) is provided in an eight-bit digital coding, and corresponding with input a0 is the least significant bit in said coding.

Each of the aforesaid inputs a0 ... a7 is coupled to a corresponding logic gate 6 of the AND type that has two inputs and one output. The second input of each gate 6 is connected to the first cell 5 of the memory 3 via the line carrying bit b0.

The group of gates 6 basically perform a binary sum of the coding of x(n) plus the bit b0 of the i-th coefficient. The result of this operation is indicated by the sequence of binary digits p′1 ... p′7 and stored in a group 9 of memory cells L, which may be latches. Each cell L is connected to the output of one of the gates 6 excepting the first, that is, the gate 6 associated with the least significant input a0. The first gate has its output A free and available as a block I output.

Presented on that output A is the least significant digit in the so-called pseudo-sum of input signal x(n) and the bit b0 of the given coefficient d(i).

It should be noted, moreover, that a branch off toward a register 10 made up of individual memory cells L is provided from each input a0, ..., a7. This register 10 holds the value of the input signal to provide it to the other blocks of multiplier 1, so that on this value further operations may be performed.

For this purpose, each cell L of the register 10 is directly connected to an identical and corresponding cell of another register 10 included in the block II.

Figure 4:
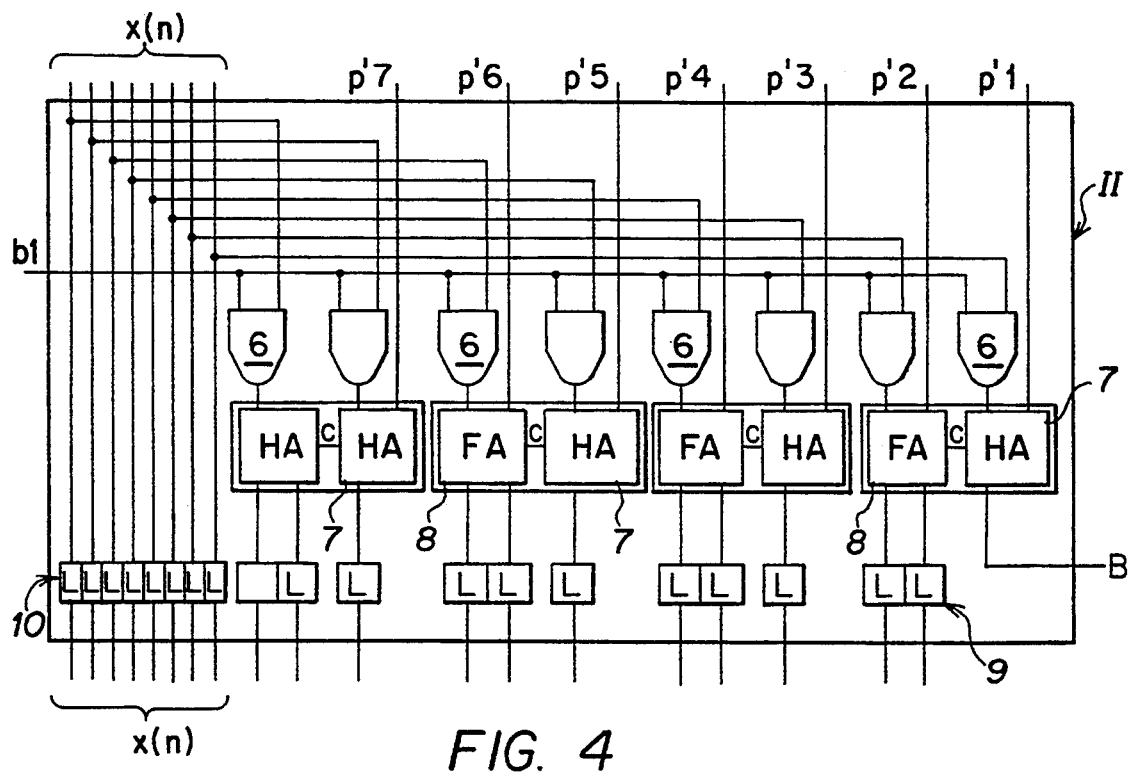
FIG. 4 is a schematic diagram of a second computation block used in the digital multiplier of FIG. 1.

The structure of the second block II is illustrated more specifically in FIG. 4. Block II also includes a parallel arrangement of logic gates 6. Each gate has two inputs and one output as in the block I.

The first input of each gate is connected to a corresponding cell L of the register 10; while the other input of each logic gate is connected to a second cell 5 of the memory 3, in order to receive a digital signal corresponding to the coefficient B1.

Advantageously, the block II also has two adders 7 and 8 in cascade connection.

More specifically, the adders 7 are of a Half Adder type and are indicated in the drawings with the abbreviation HA; while the adders 8 are Full Adders and are indicated with the abbreviation FA. In the block II pairs of Full and/or Half adders are provided with connections to pairs of outputs of the gates 6 in order to compute the carryover of the binary sum of the input signal x(n) and coefficient b1. Of course, the carryover will propagate through a single cell only.

All the adders 7 or 8, with the exception of that associated with the most significant binary digit, are input both the output signal from the corresponding gate 6 and the signal contained in the corresponding memory L of group 9 in the preceding block I.

Advantageously, the memory cells (latches) L are incorporated to the block II and connected after the adders 7 or 8 in order to store therein the so-called pseudo-carryover associated with the binary sum.

In a similar manner to that described in connection with the first block I, also in the second block II the first logic gate 6, i.e. the gate related to the least significant digit of the sum performed in that block, has an output B which is left free in order to provide an output of block II through which the value of the second bit of pseudo-addition of the two multiplicative factors can be derived.

Figure 6:
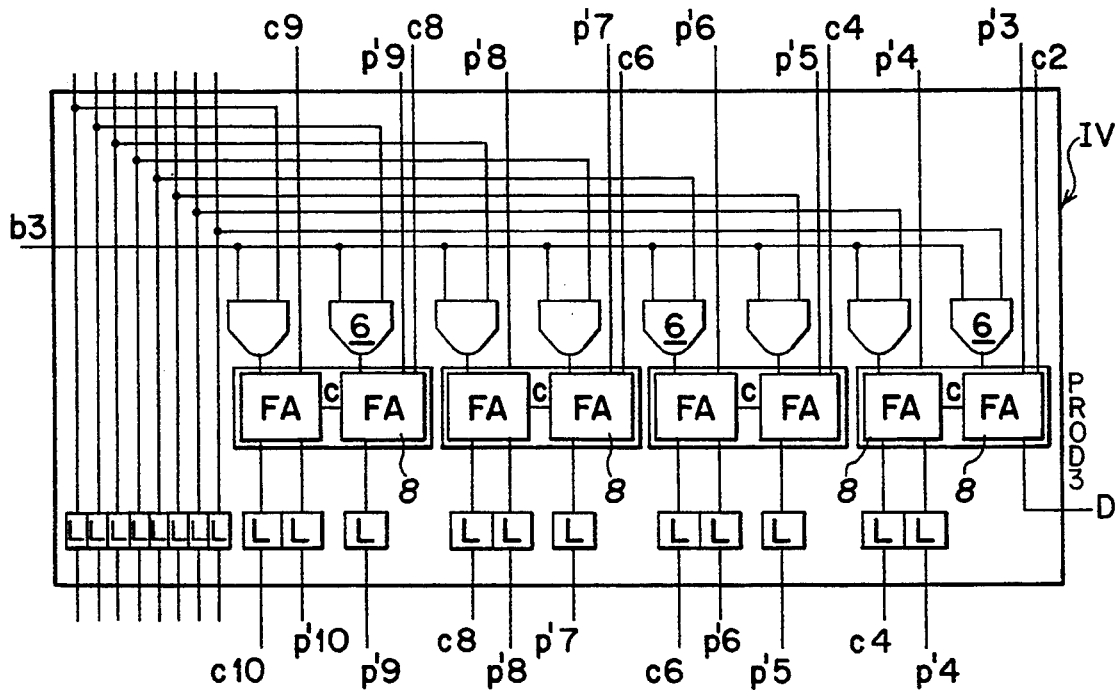
FIG. 6 is a schematic diagram of a fourth and sixth computation block used in the digital multiplier of FIG. 1.

As for the remaining blocks of multiplier 1, the even-numbered blocks IV and VI have identical structures substantially similar to that of the second block II, but with a difference in the arrangement of the HA and FA adders. This different arrangement is made necessary simply by carryover count requirements. Shown in FIG. 6 is the structure of such blocks IV and VI of the even order.

Figure 5:
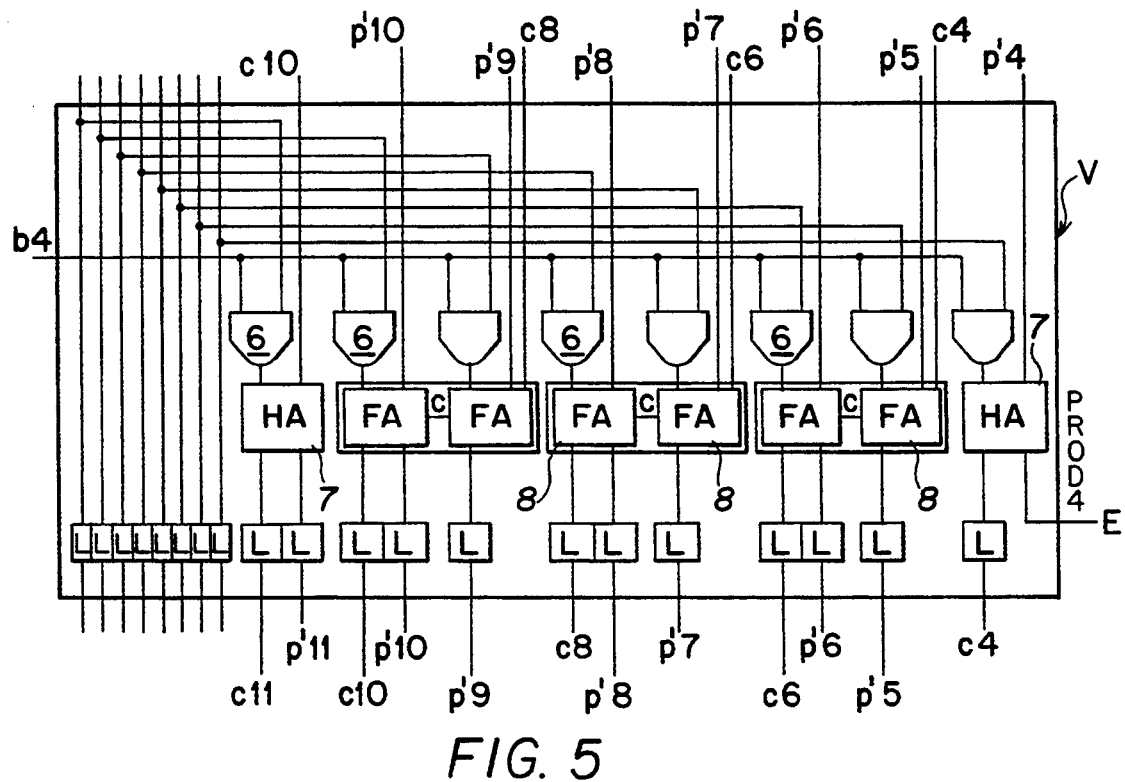
FIG. 5 is a schematic diagram of a third, fifth, and seventh computation block used in the digital multiplier of FIG. 1.

As for the odd-numbered blocks III, V and VII, these blocks all have the same structure, which is shown in FIG. 5. They differ from the even order blocks by the provision of single half adders 7 at the outputs of the first and last logic gate 6 in the group of logic gates contained within each block.

Figure 7:
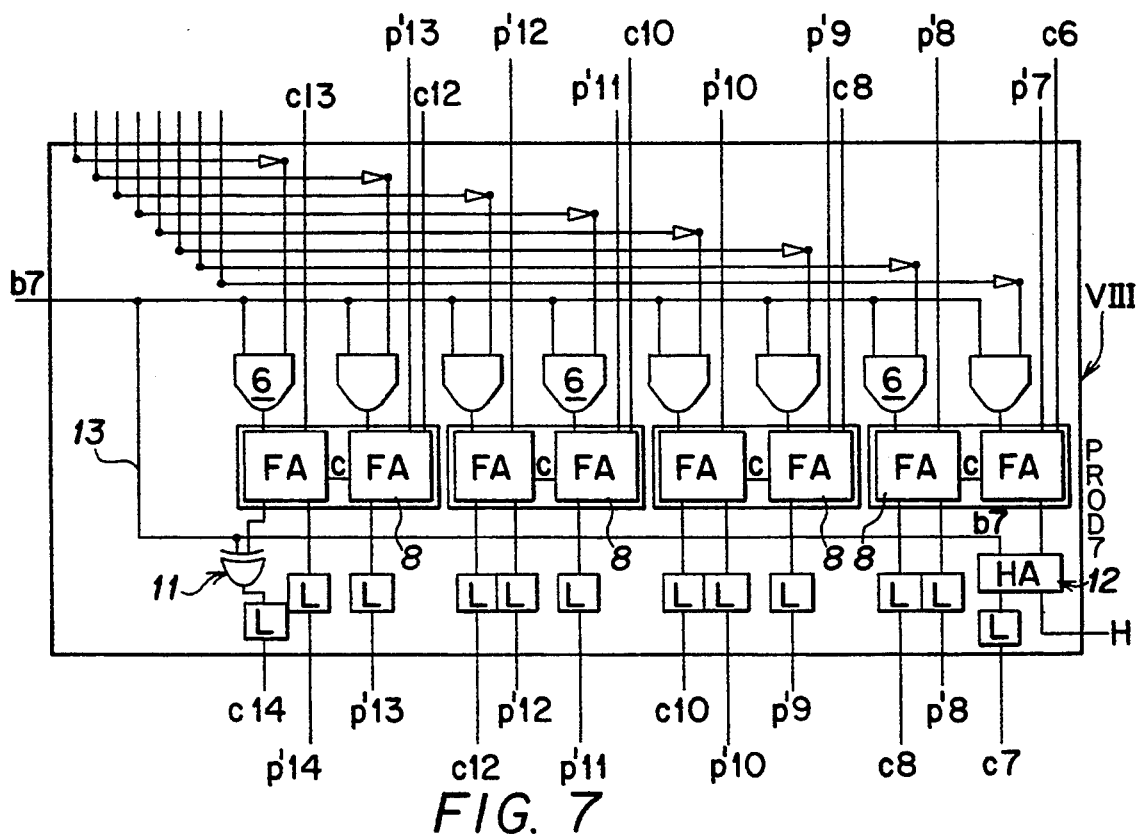
FIG. 7 is a schematic diagram of an eighth computation block used in the digital multiplier of FIG. 1.

Separate consideration is now given to the structure of the eighth block as shown in FIG. 7. This block is connected to the last cell 5 in the memory 3, i.e. the cell containing the most significant bit of the second multiplicative factor composed of the coefficients b0, ..., b7.

The value of b7 is 0 when the second factor is a positive number.

When the second factor is instead a negative number expressed in two's complement form, the logic value of b7 is set equal to 1.

Consequently, to perform the binary sum operation in block VIII with due account for any carryover, a branch-off 13 from the last cell 5 is input to a logic gate 11 of the XOR (exclusive OR) type which has another input connected to the output of the last FA adder 8 in the block.

The branch-off 13 is also extended to the first adder in block VIII for joint connection with the first adder output to a half adder 12 whose output H completes the output group A, B, ..., H of the blocks I, II, ... VIII intended to compose the pseudo-sum of the two factors, x(n) and M.

Provided at the output of the XOR gate 11 and the last half adder 12 are respective memory cells L, additional to those provided after the group of adder pairs 8.

Figure 8:
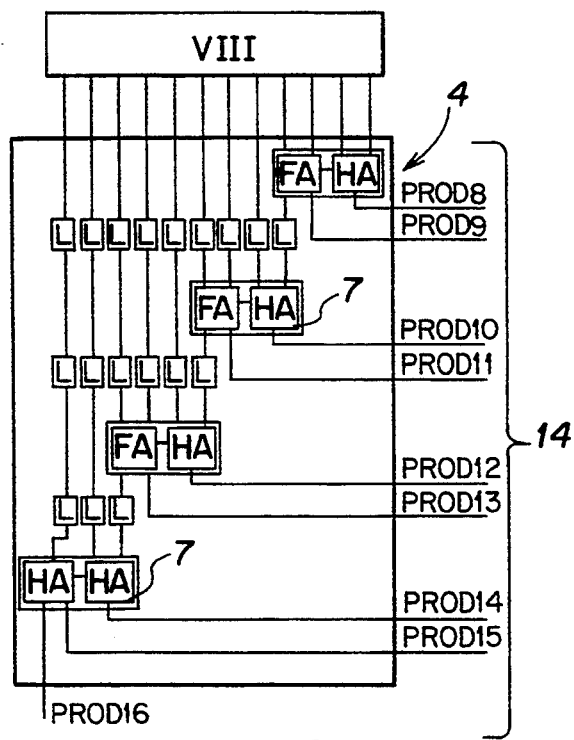
FIG. 8 is a schematic diagram of a ninth computation block used in the digital multiplier of FIG. 1.

It should be further noted that the ninth computation block 4 shown in FIG. 8 comprises essentially HA and FA adders, as well as memory cells L for receiving the outputs from preceding block VIII and performing the final sum that yields the result of the multiplication in explicit form.

The operation of the inventive multiplier will now be described with reference to an initial state wherein the input signal x(n) is presented to the inputs a0, ..., a7 of block I for multiplication by the series of coefficients b0, ..., b7 contained in the memory 3.

The multiplier 1 operates on a clock pulse, not shown because it is conventional, and the input signal x(n) is received at every clock pulse.

The input signal x(n) is encoded by a binary number that can be expressed mathematically as a sum of powers of 2:

$$x(n) = a_0 + a_1 * 2 + a_2 2^2 + \ldots + a_{N-1} * 2^{N-1}$$

The input signal x(n) will be assumed to be always positive; this introduces no limitation because, in order to sample the signal, the analog/digital converters ahead of filter 2 generally supply a positive signal.

The series of coefficients b0, ..., b7 together represent a binary number that can be expressed as a sum of powers of 2. This second binary number will be denoted hereinafter by M, followed by an indication of its plus or minus (+/−) sign.

In one case, we get:

$$M(+) = b_0 + b_1 * 2 + b_2 * 2^2 + \ldots + b_{N-1} * 2^{N-1},$$

whereas in the other case, M(−) represents a negative number expressed as a 2's complement, namely:

$$M(-) = b_0 + b_1 * 2 + b_2 * 2^2 + \ldots + b_{N-2} * 2^{N-2} + (-2^{N-1}).$$

Thus, the multiplier 1 is to address two possible multiplication types, namely x(n)*M(+) and x(n)*M(−).

When both factors are positive and represented by an N-bit coding, their product reduces to performing the binary sum of the first factor plus the second factor as shifted through N-1 positions toward the most significant bits.

On the other hand, where the second factor is negative and expressed as a 2's complement, the product of the factors reduces to performing the previous operation and adding its result to the 2's complement of the first factor as shifted through N−1 positions toward the most significant bits.

In the first computation block I, the signal X(n) is at once multiplied by coefficient b0. This operation is actually performed as a binary sum of the coding of x(n) plus the bit of coefficient b0.

The partial result yielded is stored in the group 9 of memories L placed after the logic gates 6 and constitutes a first, so-called pseudo-carryover.

It should be observed, however, that this partial result also generates the least significant bit of the product, which is made available as a pseudo-sum on the output A of block I.

The second block II has the input sample x(n) available to it in the register 10 and receives, from the block preceding it, the aforesaid partial result in pseudo-carryover form.

The input sample x(n) is applied to the AND gates 6 along with the corresponding coefficient b1, and the new sum is computed in pseudo-sum form.

The carryover propagates through a cell owing to the adders 7 and 8 being arranged in cascaded pairs. The result of this second operation is made available on the output B as the second digit of the multiplicative factor pseudo-sum, as well as in the cells L after the adders, as a pseudo-carryover for propagation to the next block.

Thus, each block will store the input sample to make it available for the next block, and add the input sample to the partial product from the preceding block.

The n-th and eighth blocks will add to the partial product the 2's complement input sample, as computed over nine bits, in the instance of the second factor M being negative.

In summary, if the number of bits per word is N, then the product of two words of N bits each is fully defined by a string of 2N bits. Therefore, the computation of the 2's complement of the first factor x(n) as shifted through N−1 positions should be carried out on 2N bits, for otherwise the result would be incorrect.

Accordingly, each internal number of the multiplier is represented by two strings of bits which constitute the partial results (pseudo-sums) and partial carryovers (pseudo-carryovers) in proper order according to their weights.

The actual number resulting from the multiplication is, therefore, obtained by propagating the carryover from one position to the next. In essence, this means that the words containing all of the pseudo-sums and pseudo-carryovers are added together.

The multiplier of this invention has a major advantage in that it provides a simple construction with fast multiplicative factor processing capability. Another important advantage of this multiplier resides in the possibility it affords of implementing digital filters of the adaptive type.

Having thus described one particular embodiment of the invention, various alterations, modifications, and improvements will readily occur to those skilled in the art. Such alterations, modifications, and improvements as are made obvious by this disclosure are intended to be part of this disclosure thought not expressly stated herein, and are intended to be within the spirit and scope of the invention. Accordingly, the foregoing description is by way of example only is not intended as limiting. The invention is limited only as defined in the following claims and equivalents thereto.

What is claimed is:

1. A diagonal propagation digital multiplier for multiplying a first factor by a second factor comprising:
   a non-volatile, programmable memory having a plurality of cells each with one digit of the second factor stored therein; and
   a plurality of computation blocks being cascade connected to one another and also each computation block being coupled to a respective corresponding cell in the memory, wherein each computation block includes:
a register storing the first factor, wherein the registers in all computation blocks are interconnected,
a computation stage for computing a binary sum of the first factor and at least one digit of the second factor, said computation stage including logic gates arranged in parallel and each having a first input connected to the respective corresponding cell in the memory and a second input receiving a digital signal corresponding to one digit of the first factor, and wherein a first logic gate corresponding to a least significant digit of the first factor outputs a digital signal related to one digit of a pseudo-sum of the first and second factors, and
a plurality of memory elements for storing the binary sum and making the binary sum available as a pseudo-carryover to a succeeding computation block in the plurality of computation blocks.

2. The multiplier of claim 1, wherein, with the exception of a first, second, and last computation block, even-numbered blocks have identical structures with each other and odd-numbered blocks have identical structures with each other.

3. The multiplier of claim 1, wherein a last of the computation blocks includes a logic gate of an exclusive-or (XOR) type having an input connected directly to its respective corresponding cell in the memory.

4. The multiplier of claim 1, further comprising adder pairs, operatively disposed between the computation stage and the memory elements, operative to compute the pseudo-carryover.

5. A digital filter comprising:
a plurality of interconnected stages, each stage including a multiplier having an output coupled to a first input of an adder, the adder having a second input coupled to an output of a previous stage, and a delay block coupled to an output of the adder and providing an output of the stage, and
a first stage including a multiplier having an output coupled to a delay block,
wherein the multiplier in each of said plurality of stages and the first stage includes a diagonal propagation digital multiplier for multiplying a first factor by a second factor, said diagonal propagation digital multiplier including:
a memory having a plurality of cells each with one digit of the second factor stored therein;
a plurality of computation blocks being cascade connected to one another and also each computation block being coupled to a respective corresponding cell in the memory;
a computation stage in each of the computation blocks for computing a binary sum of the first factor and at least one digit of the second factor; and
a plurality of memory elements in each of the computation blocks for storing the binary sum and making the binary sum available as a pseudo-carryover to a succeeding computation block in the plurality of computation blocks.

6. The digital filter of claim 5, wherein the memory is a non-volatile memory.

7. The digital filter of claim 6, wherein the memory is a programmable memory.

8. The digital filter of claim 7, wherein within each block, a first of the logic gates that correspond to a least significant digit of the first factor outputs a digital signal related to one digit of a pseudo-sum of the first and second factors.

9. The digital filter of claim 5, wherein the computation stage comprises logic gates arranged in parallel and each having a first input connected to the respective corresponding cell in the memory and a second input receiving a digital signal corresponding to one digit of the first factor.

10. The digital filter of claim 5, wherein each computation block further comprises a register storing the first factor and wherein the registers in all computation blocks are interconnected.

11. The digital filter of claim 5, wherein, with the exception of a first, second, and last computation block, even-numbered blocks have identical structures with each other and odd-numbered blocks have identical structures with each other.

12. The digital filter of claim 5, wherein a last of the computation blocks includes a logic gate of an exclusive-or (XOR) type having an input connected directly to its respective corresponding cell in the memory.

13. The digital filter of claim 5, further comprising adder pairs, operatively disposed between the computation stage and the memory elements, operative to compute the pseudo-carryover.

14. The digital filter of claim 5, wherein the filter is a finite impulse response type filter.

15. A diagonal propagation digital multiplier for multiplying a first factor by a second factor comprising:
a memory having a plurality of memory cell means for storing one digit of the second factor in each cell;
a plurality of computation blocks being cascade connected to one another and to a respective corresponding memory cell means in the memory, wherein each computation block includes a register storing the first factor, wherein the registers in all computation blocks are interconnected;
a computation means in each of the computation blocks for computing a binary sum of the first factor and at least one digit of the second factor; and
a plurality of memory element means in each of the computation blocks for storing the binary sum and for making the binary sum available as a pseudo-carryover to a succeeding computation block in the plurality of computation blocks.

* * * * *